United States Patent Office 3,218,671
Patented Nov. 23, 1965

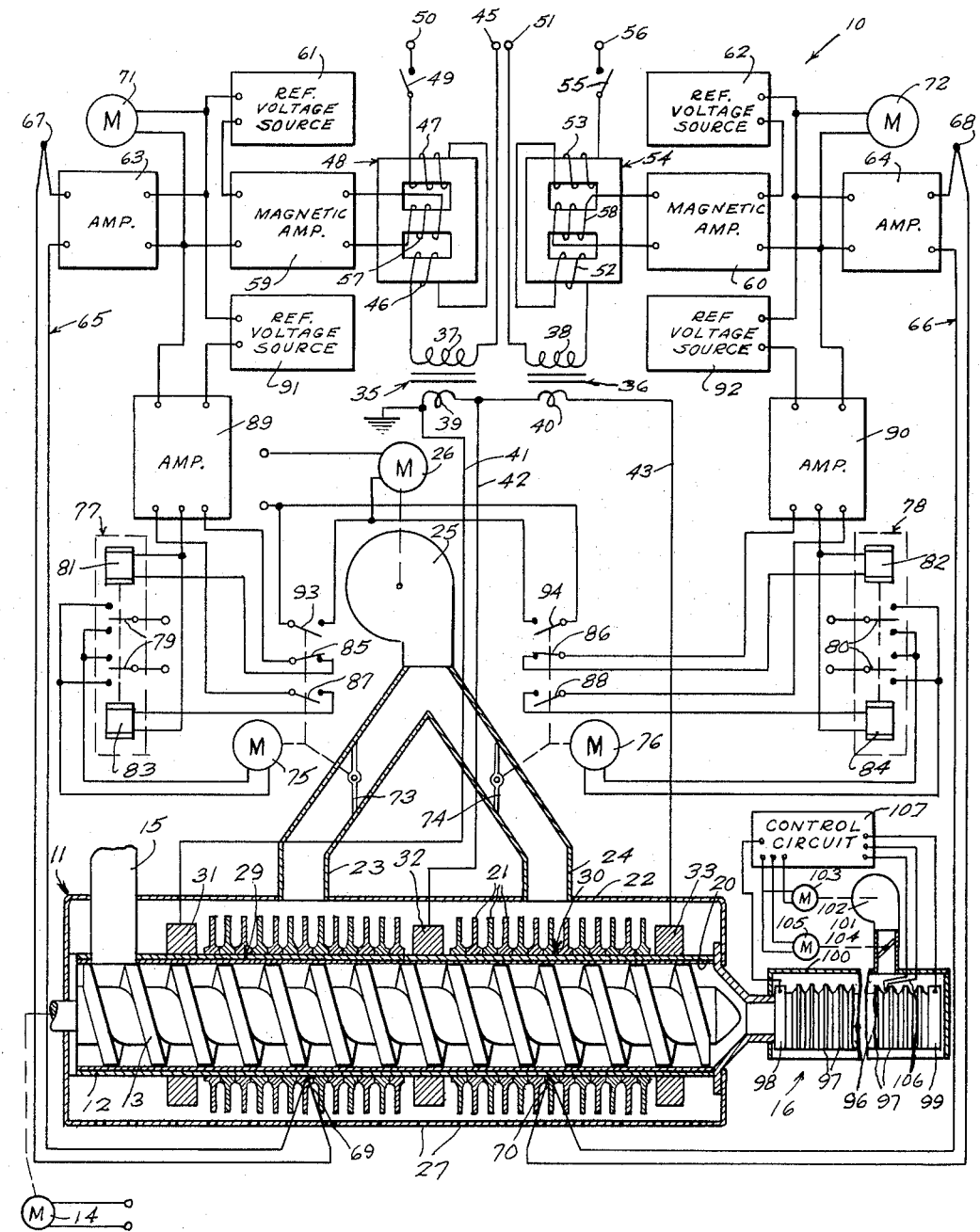

3,218,671
PLASTIC EXTRUDER WITH AUTOMATIC
TEMPERATURE CONTROL
Edgar J. Justus, Beloit, Wis., and Robert A. Daane, Rockford, Ill., assignors to Beloit Corporation, Beloit, Wis., a corporation of Wisconsin
Filed Apr. 4, 1962, Ser. No. 185,099
2 Claims. (Cl. 18—12)

This invention relates to the art of feeding and extruding thermoplastic materials and in particular to improvements in apparatus for maintaining thermoplastic material at predetermined temperatures during feeding and extrusion operations.

In the extrusion of thermoplastic material it is conventional to employ screw type extrusion machines, in which a conveying or feeding screw rotates within an elongated barrel to advance plastic material through the barrel and out of a suitable die or extrusion orifice at one end thereof. As the plastic material is moved through the extruder barrel, heat and work is applied to the plastic material, so that as the material reaches the extrusion orifice it will be heated to a temperature suitable for carrying out the extrusion operation.

Plastic materials used in extrusion operations today often require that the temperature must be accurately controlled in order to carry out the extrusion process effectively. If the plastic material is either below or above a prescribed temperature, it will in the first instance not be sufficiently plasticized and in the second instance it may tend to discolor or undergo improper extrusion.

In the past, barrels and heads of extruding machines have been temperature controlled by the provision of jackets or chambers thereabout through which temperature controlling liquid is circulated. Such liquid heat controlling means, however, have been bulky and expensive to make and operate as well as being subject to various types of failures, such as the leakage of the liquid at various joints in the system.

It has been attempted to dispense with liquid temperature controlling of parts of extruding machines and to heat them electrically such as by the provision of electric heating bands around the barrel, and to cool them by necessarily limited water cooling passages interposed between the bands and the plastic material conveying passage in the machine part. Another arrangement has employed as an extrusion barrel heating and cooling means a heavy walled metal sheet wrapped around the barrel, the sheet having electric heating elements of the tubular resistance type embedded therein, and having fins on the outer surface of the sheet to cool the barrel.

Such electric heating and water cooling methods have not proven to be entirely satisfactory since in the first case the barrel has been unevenly heated as a result of the expansion of the bands and has been unevenly cooled because of the limited cooling passages. In the second case, there has been poor contact between the sheet and the barrel which results in poor heat transfer due to expansion of the sheet as it is heated, and the cooling of the barrel has been poor because the heating means is interposed between the cooling surfaces and the barrel. In general, prior proposed constructions employing electric heating means for the barrel or other parts of the extruding machine have utilized separate surfaces built into the barrel for heating and cooling the barrel, either the heating or the cooling means being disposed closer to the bore of the barrel than the other means.

Another difficulty encountered in connection with prior arrangements is that the temperature may vary greatly with changes in operating conditions. It has been found that this is due to the slow rate of heat transfer through the material to and from the heating and cooling means disposed around the extruding or feeding head. When heat is applied to the extruder barrel, for example, there is a definite delay before it becomes sufficiently heated to transfer heat into the material. Similarly, after the application of heat is terminated the parts of the apparatus contain sufficient residual heat to continue the conduction of heat to the plastic barrel, tending to cause overheating. The problem is further complicated by the fact that the plastic material is generally in constant movement so that substantial quantities of heat must be added to bring the incoming material up to the desired temperature. However, if the extruding apparatus is temporarily stopped, the plastic tends to overheat quickly, since due to poor heat transfer characteristics the temperature of the outer circumference of the extruder barrel is substantially higher than the temperature of the inner circumference, and since no heat is being taken away by the plastic material, the inner circumference has to assume a temperature averaging between the inner and outer circumference temperatures which is substantially higher than the temperature of the inner circumference during normal operation.

The present invention was evolved with the general object of overcoming the difficulties and problems encountered with prior arrangements such as those discussed above.

In brief, the invention involves the resistance heating of the extruder barrel with a low voltage, high amperage electric current using the barrel itself as the heating element, and the provision of apparatus for automatically controlling the current and the application of a cooling fluid. With the arrangement of this invention, the walls of the barrel are uniformly heated, heating of the plastic material is very stable and a rapid and highly responsive control over the temperature of the plastic material is obtained. Additional advantages reside in the simplification of construction, the obtaining of a highest temperature point at the inside wall of the barrel, a very rapid heating time, a high circumferential strength with respect to pressure within the barrel, and in the use of an extruding barrel of small cross-sectional area to minimize the amount of material to be heated.

This invention contemplates other objects, features, and advantages which will become more fully apparent from the following detailed description taken in conjunction with the accompanying drawing, in which the single figure is the diagrammatic view of an extruding machine heating system constructed according to this invention.

Referring to the drawing, reference numeral 10 generally designates a heating system constructed according to this invention. The system 10 includes a plastic extruder 11 having a barrel 12 through which a conveyor screw 13 extends, screw 13 being driven by a motor 14 as diagrammatically illustrated. Plastic material is fed in granual or divded form from a hopper (not shown) and through a feed pipe 15 into one end of the barrel 12 and is fed from the other end of the barrel 12 into a die head 16 having an opening of a certain shape and size to form the desired end product.

The barrel 12 is heated electrically and has a thin inner liner 20 of wear-resistant material. To cool the barrel at appropriate times, a plurality of annular axially spaced cooling rings or ribs 21 are provided therearound, and the barrel is surrounded by a jacket 22 to form a chamber which is connected by air conduits to a blower 25 driven by an electric motor 26. Air is exhausted from the chamber through vent openings 27 in the side of the jacket 22 opposite the air conduits 23 and 24.

It is noted that the invention may be applied to other forms of feeding and extruding apparatus including for example, extruders having two conveyor screws having left and/or right hand threads which may or may not intermesh, disposed in a barrel of oval shaped cross-section, rather than a circular section as illustrated.

As the plastic material is moved through the barrel it is gradually heated and subjected to pressure by the screw to be formed into a soft homogeneous mass which is forced through the orifice of the die head 16. By way of example, the material may start at a temperature of 75° F. at the inlet of the barrel and end at a temperature of 600° F. at the outlet of the barrel.

According to an important feature of the invention, the barrel 12 itself is used as the electrical heating element by passing current longitudinally therethrough. In the illustrated system, the barrel 12 is divded electrically into two zones 29 and 30 respectively referred to herein as a "cold" zone and a "hot" zone. These cold and hot zones 29 and 30 are established by three electrode rings 31, 32 and 33 surrounding the barrel at points spaced therealong, rings 31–33 being connected to low voltage, high amperage current sources as described hereinafter. The rings 31–33 are of large cross-sectional area to provide a low resistance current path to the barrel, so that very little heat is developed in the rings themselves, the heat being thereby developed in the barrel 12. To provide good contact with a minimum of electrical resistance, the rings 31–33 may preferably be bonded to the barrel 12 with silver solder or other suitable material. The cooling rings or ribs 21, on the other hand, are merely slipped over the barrel with a light press fit, sufficient to permit free flow of heat from the barrel 12 to the ribs, but preferably with a relatively high electrical contact resistance, to minimize current flow in the ribs themselves and thereby concentrate the current flow in the barrel. To further minimize current flow in the ribs 21, the cross-sectional areas of facing portions of adjacent ribs are minimized, as illustrated. If desired, they may be spaced a slight distance apart or otherwise insulated from one another. The use of ribs which are not integral with the barrel is also an advantage with respect to fabrication of the elements and the elimination of maching operations.

Numerous and radical advantages are obtained with this arrangement. An intense heat may be rapidly developed in each section of the barrel, equal to the square of the current flow in amperes multiplied by the resistance of the barrel in ohms. With the barrel having a thin wall of uniform thickness, the current density is substantially constant, except as reduced at the outer surface due to the cooling ribs 21. The highest temperature point is at the inside surface of the barrel, with a temperature gradient such that heat flow is generally outwardly. When the frictional heat generated by the screw 13 is greater than that required to maintain the desired temperature of the extruded plastic, there is a rapid flow of heat outwardly through the wall of the barrel, since the outer surface thereof is generally at a lower temperature than the inner surface thereof.

Important features of the invention reside in apparatus for controlling supply of current to the barrel and controlling the supply of cooling air, in a manner to obtain highly stable, reliable and efficient operation. As diagrammatically illustrated, a pair of transformers 35 and 36 are provided having high voltage primary windings 37 and 38 and low voltage, high amperage secondary windings 39 and 40. Secondary winding 39 is connected to conductors 41 and 42 connected to the rings 31 and 32, while secondary winding 40 is connected to the conductor 42 and to a conductor 43 which is connected to the ring 33. Conductor 41 may be grounded as illustrated. The conductors 41–43 preferably have a large cross-sectional area and a minimum length with the transformers located as close as practically possible to the extruder, so as to minimize resistance and obtain highest possible efficiency.

One terminal of primary winding 37 is connected to a supply line terminal 45 while the other terminal thereof is connected through windings 46 and 47 of a saturable reactor 48 and through a switch 49 to a second supply line terminal 50. Similarly, one terminal of primary winding 38 is connected to a supply line terminal 51 while the other terminal thereof is connected through windings 52 and 53 of a second saturable reactor 54 and through a switch 55 to a supply line terminal 56. Terminals 45, 50, 51 and 56 are connected to a suitable source, or sources, of alternating current.

The saturable reactors 48 and 54 have control windings 57 and 58 on the center legs of three-legged cores thereof, windings 46, 47 and 52, 53 being on the outer legs of the cores. The polarity of connection of the windings is such that current through the windings 46 and 47 produces magnetic fluxes in the same direction through the center leg and when the control winding current is zero, the center leg has a low magnetic reluctance, so that the inductive impedances of the windings 46 and 47 are very high, thereby reducing the voltage applied to the primary winding 37 to a minimum value. When a current is applied to the control winding 57, the magnetic flux in the center leg moves toward saturation, thereby reducing the reluctance of the center leg and thus decreasing the inductive impedances of the windings 46 and 47 to increase the voltage applied to the primary winding 37. The operation is, of course, the same with respect to the saturable reactor 54. Saturable reactors 48 and 54 are controlled in accordance with temperatures in the cold and hot zones 29 and 30, in a manner to maintain the temperatures at substantially constant values. In particular, the control windings 57 and 58 are respectively connected to the outputs of magnetic amplifiers 59 and 60 having inputs connected in series with reference voltage sources 61 and 62 to the outputs of a pair of amplifiers 63 and 64. Amplifiers 63 and 64 have inputs connected to thermocouple circuits 65 and 66 including cold junctions 67 and 68 and hot junctions 69 and 70 positioned in the wall of barrel 12 at central positions of the hot and cold zones. Meters 71 and 72 are connected to the outputs of the amplifiers 63 and 64 and may preferably be calibrated in temperature units.

By way of example, it may be desirable to operate the apparatus with the barrel of the cold zone 29 at a temperature of 450° F. and with the barrel of the hot zone 30 at a temperature of 650° F., to obtain a plastic temperature varying from 75° F. at the barrel inlet to 400° F. at the barrel outlet.

Under such conditions, a certain voltage is applied from the thermocouple circuit 65 to the input of the amplifier 63, the voltage is thereby applied to the input of magnetic amplifier 59 equal to the difference between the output of amplifier 63 and the output of the reference voltage source 61, a certain current is thereby applied to the control coil 57 of the saturable reactor, a certain voltage is thereby applied to the transformer primary 37 and a certain current is applied from the transformer secondary 39 to the electrodes 31 and 32 and the section of the barrel 12 in the cold zone. If, for some reason, the temperature of the thermocouple junction 69 is then decreased, for example, a lower voltage is applied to the input of amplifier 63 to develop a lower voltage at the output thereof. The voltage applied to the magnetic amplifier 59, however, is increased, the voltage from the source 61 being in opposition to the voltage from the output of amplifier 63 and in opposed polarity relation. With the increased voltage applied to the magnetic amplifier, a higher current is applied to the control winding 57 to decrease the effective impedance of the windings 46 and 47, and a higher voltage is thereby applied to the transformer primary 37 and a higher voltage and current are applied to the section of the barrel in the cold zone 29.

Thus the heat applied to the cold section 29 is increased in response to a drop in temperature of the thermocouple junction 69. In an opposite fashion, the heat applied is decreased in response to an increase in temperature of the junction 69. As a result, the system operates to tend to maintain a constant temperature in the cold zone 29. In the same way, the system also operates to maintain a constant temperature in the hot zone 30, the construction and operation of the hot zone control apparatus being the same as that of the cold zone control apparatus.

In some circumstances, the temperature in one or the other or both zones may greatly exceed the desired value or values even though the electrical power input to the electrodes is reduced to a minimum value. Such may occur, for example, when the conveyor screw 13 becomes jammed or when there is a sudden decrease in the supply of plastic through the zones. In that event, the system operates automatically to open one or the other or both of a pair of dampers 73 and 74 in the conduits 23 and 24 and to then energize the blower motor 26 so as to rapidly cool the cold zone or the hot zone, or both. In particular, the dampers 73 and 74 are controlled by a pair of motors 75 and 76 which are connected to fixed contacts of differential relays 77 and 78 having pairs of movable contacts 79 and 80 connected to a suitable source of supply voltage. Each pair of movable contacts is movable in one direction (upwardly as viewed in the drawing) to energize the respective motors 75 or 76 in a direction to open the dampers 73 or 74 and is movable in the opposite direction to energize the respective motors 75 or 76 in a direction to close the dampers 73 or 74.

The differential relays 77 and 78 have coils 81 and 82 energizable for opening the dampers and coils 83 and 84 energizable for closing the dampers. The coils 81–84 are connected through limit switch contacts 85–88 (mechanically connected to the dampers as diagrammatically illustrated) to amplifiers 89 and 90 having inputs connected in series with reference voltage sources 91 and 92 to the outputs of amplifiers 63 and 64. Another pair of limit switch contacts 93 and 94 are connected in parallel, the parallel combination thereof being connected in series with the blower motor 26.

When, for example, the temperature in the cold zone 29 exceeds a certain value a signal is applied from the thermocouple circuit 65 through amplifier 63 of sufficient magnitude to develop an output from the amplifier 89 to energize the coil 81. The motor 75 is then energized in a direction to open the damper 73 and when the damper is fully opened, the limit switch contact 85 is then opened to deenergize the coil 81 and thereby deenergize the motor 75. At the same time, the limit switch contact 93 is closed to energize the blower motor. Thus air is forced through the cold zone 29 to rapidly cool the same. When the temperature in the cold zone drops below a certain value, the coil 83 of differential relay 79 is energized to energize the motor 75 in a direction to close the damper 73, the limit switch contact 87 in series with the coil 83 being closed when the damper is moved slightly away from its fully closed position. The limit switch contact 93 is opened when the damper is moved away from its fully open position, to deenergize the blower motor 26 and when the damper is fully closed, the contact 87 is opened to deenergize the coil 83 and thereby deenergize the motor 75. The operation is the same with respect to the hot zone 30, it being noted that the blower motor 26 is automatically energized when either the damper 73 or the damper 74 is fully opened, or when both dampers are fully opened.

A further important feature of the invention relates to the heating and control of the die head 16. The illustrated die head 16 is designed for the formation of the plastic into flat sheet material and comprises a thin plate 96 formed into a hollow elongated member which receives the plastic from the feeding apparatus, the lower edges of the plate 96 being in closely spaced parallel relation to form a longitudinally extending orifice along the lower side from which the plastic is forced downwardly in the form of a sheet. Disposed about the plate 96 are a plurality of reinforcing and cooling ribs 97, open at the lower end thereof for passage of the plastic sheet. Electrodes 98 and 99 are secured about longitudinally spaced portions of the plate 96. The assembly is surrounded by a housing 100, also open at its lower side for passage of the plastic sheet therethrough, with the upper side of the housing being coupled through an air conduit 101 to a blower 102 driven by a motor 103. A damper 104 in the conduit is actuated by a motor 105. A thermocouple junction 106 is used to sense the temperature of the plate 96 and is connected to a control circuit 107, along with the motors 103 and 105 and the electrodes 98 and 99. Control circuit 107 is of the same design and operates the same as that portion of the above described circuit which is connected to the electrodes 31 and 32, the motors 26 and 75 and the thermocouple junction 69.

Although only two electrodes 98 and 99 are illustrated, it will be understood that one or more additional electrodes may be used in conjunction with one or more additional dampers and one or more additional thermocouple junctions, to provide two or more heating zones in the die head.

It is noted that instead of heating the plate 96 by current flow therethrough, a metal sheet with embedded resistance heating elements may be wrapped around the plate 96 and the elements may be energized in the same manner with appropriate changes in the transformer turns ratio, or with the transformer eliminated by appropriate selection of the resistance values of the heating elements.

It will be understood that modifications and variations may be effected without departing from the spirit and scope of the novel concepts of this invention.

We claim as our invention:

1. In apparatus for processing plastic material or the like,
    an elongated hollow member of electrically conductive material having inlet and outlet openings,
    means for effecting flow of material from said inlet opening and out through said outlet opening,
    a plurality of electrodes engaged with longitudinally spaced portions of said member,
    a transformer having a primary winding and having a low voltage high amperage secondary winding connected to said electrodes,
    means for connecting said primary winding to a current supply including a saturable reactor having a winding in series with said primary winding and having a control winding,
    amplifier means having an input and having an output connected to said control winding,
    and thermocouple means for sensing the temperature of said member and applying a temperature signal to said amplifier input.

2. In apparatus for processing plastic material or the like,
    an elongated member of electrically conductive material having inlet and outlet openings,
    means for effecting flow of material from said inlet opening and out through said outlet opening,
    at least three electrodes engaged with longitudinally spaced portions of said member and defining at least two heating zones,
    and current supply means for each zone including
        a transformer having a primary winding and having a low voltage high amperage secondary winding connected to the electrodes on opposite sides of each zone,
        means for connecting said primary winding to a current supply including a saturable reactor having a winding in series with said primary winding and having a control winding, amplifier means having an input and having an output connected to said control winding, and thermocouple means for sensing the temperature of said member and applying a temperature signal to said amplifier input.

References Cited by the Examiner
UNITED STATES PATENTS

| | | |
|---|---|---|
| 1,902,295 | 3/1933 | Shook _____ 18—12 |
| 2,194,283 | 3/1940 | Kidd. |
| 2,633,433 | 3/1953 | Langer _____ 219—19.10 X |
| 2,763,766 | 9/1956 | Lyon _____ 219—19.10 X |
| 2,774,107 | 12/1956 | Davis. |
| 2,832,879 | 4/1958 | Van Riper _____ 18—12 |
| 2,893,055 | 7/1959 | Wenzel _____ 18—12 |
| 2,904,664 | 9/1959 | Rothacker _____ 18—12 X |
| 3,055,053 | 9/1962 | Livingston et al. _____ 18—12 |

WILLIAM J. STEPHENSON, *Primary Examiner.*

MICHAEL V. BRINDISI, *Examiner.*